United States Patent
Yoshida (10) Patent No.: US 8,705,179 B2
(45) Date of Patent: Apr. 22, 2014

(54) ZOOM LENS SYSTEM

(75) Inventor: Masashi Yoshida, Suwa (JP)

(73) Assignee: Nittoh Kogaku K.K., Nagano (JP)

( * ) Notice: Subject to any disclaimer, the term of this patent is extended or adjusted under 35 U.S.C. 154(b) by 238 days.

(21) Appl. No.: 13/399,656

(22) Filed: Feb. 17, 2012

(65) Prior Publication Data

US 2012/0212834 A1 Aug. 23, 2012

(30) Foreign Application Priority Data

Feb. 22, 2011 (JP) .................................. 2011-35961

(51) Int. Cl.
*G02B 15/14* (2006.01)
*G02B 15/173* (2006.01)

(52) U.S. Cl.
CPC .............. *G02B 15/173* (2013.01); *G02B 15/14* (2013.01)
USPC ............................ 359/676; 359/683; 359/684

(58) Field of Classification Search
CPC ......... G02B 5/14; G02B 15/24; G02B 15/173
USPC ................................. 359/676, 683
See application file for complete search history.

(56) References Cited

U.S. PATENT DOCUMENTS

| 5,694,252 A * | 12/1997 | Yahagi ......................... 359/684 |
| 7,286,304 B1 * | 10/2007 | Ohtake ........................ 359/774 |
| 8,154,801 B2 * | 4/2012 | Suzaki et al. ................ 359/557 |
| 2010/0091171 A1 * | 4/2010 | Miyazaki et al. ............. 348/345 |

FOREIGN PATENT DOCUMENTS

JP 07-311340 11/1995

* cited by examiner

*Primary Examiner* — Jordan Schwartz
(74) *Attorney, Agent, or Firm* — Thompson Hine LLP (57) ABSTRACT

A zoom lens system has a combined focal length fw at the wide angle end and includes, in order from an object side, a first lens group with positive refractive power and combined focal length f1; a second lens group with negative refractive power; a third lens group with positive refractive power; a fourth lens group with positive refractive power; and a fifth lens group with positive refractive power and including, in order from the object side, a negative biconcave lens with focal length f51 and a positive biconvex lens with focal length f52, the negative biconcave lens and the positive biconvex lens disposed with an air space shorter than a center thickness of the negative biconcave lens in between and both surfaces of the positive biconvex lens being aspherical. The system satisfies the following conditions: 13.5<f1/fw<17.5, and 1.0<|f51/f52|<1.5.

5 Claims, 6 Drawing Sheets

| Lens surface number | Ri | di | Di | nd | νd | Lens name | Focal Length Group |
|---|---|---|---|---|---|---|---|
| Object side | | | | | | | |
| 1 | 72.225 | 1.200 | 47.10 | 1.84666 | 23.8 | L11 | 62.10 |
| 2 | 39.490 | 8.505 | 43.00 | 1.48749 | 70.2 | L12 L1B | |
| 3 | -533.343 | 0.150 | 42.00 | | | | |
| 4 | 34.218 | 5.087 | 37.80 | 1.79951 | 42.2 | L13 | |
| 5 | 70.000 | V1 | 36.30 | | | | |
| 6 | 26.845 | 0.800 | 19.90 | 1.88299 | 40.8 | L21 | -9.64 |
| 7 | 8.632 | 6.164 | 14.40 | | | | |
| 8 | -12.902 | 0.800 | 14.10 | 1.83480 | 42.7 | L22 | |
| 9 | 23.914 | 1.296 | 14.60 | | | | |
| 10 | 319.469 | 3.688 | 14.80 | 1.84666 | 23.8 | L23 | |
| 11 | -17.624 | 0.150 | 15.60 | | | | |
| 12 | -27.126 | 1.500 | 15.50 | 1.53460 | 55.7 | L24 | |
| 13 | -26.400 | V2 | 15.60 | | | | |
| 14 | Flat | 1.000 | 10.80 | | | Stop S | |
| 15 | 17.346 | 2.206 | 11.50 | 1.69350 | 53.2 | L31 | 27.41 |
| 16 | 64.944 | 0.227 | 11.40 | | | | |
| 17 | 11.082 | 3.894 | 11.40 | 1.49700 | 81.5 | L32 | |
| 18 | -39.807 | 0.150 | 10.70 | | | | |
| 19 | 36.359 | 0.600 | 10.10 | 1.70153 | 41.2 | L33 | |
| 20 | 8.373 | V3 | 9.30 | | | | |
| 21 | 16.146 | 2.995 | 9.50 | 1.61800 | 63.3 | L41 | 26.20 |
| 22 | -16.146 | 0.578 | 9.40 | | | | |
| 23 | -14.572 | 0.600 | 9.10 | 1.80517 | 25.4 | L42 | |
| 24 | -63.141 | V4 | 9.10 | | | | |
| 25 | -15.114 | 0.800 | 8.60 | 1.74076 | 27.8 | L51 | 22.28 |
| 26 | 16.075 | 0.269 | 8.90 | | | | |
| 27 | 12.051 | 3.508 | 9.40 | 1.80609 | 40.9 | L52 | |
| 28 | -12.412 | V5 | 9.60 | | | | |
| 29 | Flat | 1.000 | | 1.51633 | 64.1 | | |
| 30 | Flat | 0.000 | | | | | |
| Image side | | | | | | | |

| | Focal length | F number |
|---|---|---|
| WIDE | 3.84 | 1.7 |
| TELE | 45.92 | 2.4 |

(b)

| | K | A | B | C | D |
|---|---|---|---|---|---|
| S12 | 0.0 | 1.34753E−04 | −1.08765E−06 | −3.53422E−08 | 4.41506E−10 |
| S13 | 0.0 | 4.43462E−05 | −2.93294E−07 | −2.92607E−08 | 2.50928E−10 |
| S15 | 0.0 | −5.26711E−05 | −2.53497E−07 | −6.29654E−09 | 1.34335E−10 |
| S16 | 0.0 | 1.39700E−05 | −3.70727E−08 | −3.67147E−09 | 1.57266E−10 |
| S27 | 0.0 | −1.08377E−04 | −5.30370E−06 | 2.88399E−07 | −8.22455E−09 |
| S28 | 0.0 | 1.84388E−04 | −6.09993E−06 | 3.76949E−07 | −9.06388E−09 |

(c)

| di | 5(V1) | 13(V2) | 20(V3) | 24(V4) | 28(V5) |
|---|---|---|---|---|---|
| WIDE | 0.800 | 40.269 | 8.021 | 2.334 | 5.596 |
| MIDD | 20.454 | 13.788 | 8.813 | 8.896 | 5.099 |
| TELE | 35.564 | 1.000 | 1.796 | 14.425 | 4.255 |

ZOOM LENS SYSTEM

CROSS-REFERENCE TO RELATED APPLICATIONS

This application is based upon and claims the benefit of priority from the prior Japanese Patent Application No. 2011-35961, filed Feb. 22, 2011, the entire contents of which are incorporated herein by reference.

BACKGROUND

The present invention relates to a zoom lens system with a high zoom ratio.

Japanese Laid-Open Patent Publication No. H07-311340 discloses a compact zoom lens that includes wide-angle focal lengths, has a zoom ratio of around 3× or more, and favorably corrects various types of aberration. The publication discloses a zoom lens system in which a first lens group with positive refractive power, a second lens group with negative refractive power, a third lens group with positive refractive power, a fourth lens group with positive refractive power, and a fifth lens group with positive refractive power are disposed, where zooming is carried out from the wide-angle end to the telephoto end by moving the first lens group, the third lens group, the fourth lens group, and the fifth lens group toward the object, and, when a focal length of the second lens group is expressed as f2, a combined focal length of the entire zoom lens at the wide-angle end is expressed as fw, the combined focal length of the first lens group and the second lens group at the telephoto end is expressed as fT12, and a focal length of the entire zoom lens at the telephoto end is expressed as fT, where the conditions (−0.8<f2/fw<−0.5) and (−0.7<fT12/fT<−0.3) are satisfied.

In applications such as a digital video camera used for teleconferencing and security purposes, there is demand for a zoom lens that is bright, compact, and has high performance.

SUMMARY

One aspect of the present invention is a zoom lens system including, in order from a object side, a first lens group with positive refractive power, a second lens group with negative refractive power, a third lens group with positive refractive power, a fourth lens group with positive refractive power; and a fifth lens group with positive refractive power. The fifth lens group includes, in order from the object side, a negative biconcave lens and a positive biconvex lens, the two lenses being disposed with an air space that is shorter than or equal to a center thickness of the negative biconcave lens in between and both surfaces of the positive biconvex lens being aspherical. The air space should preferably be shorter than the center thickness of the negative biconcave lens. When zooming from a wide-angle end to a telephoto end, the first lens group does not move, the second lens group, the third lens group, the fourth lens group, and the fifth lens group move, and focus adjustments are carried out by the fifth lens group. A combined focal length f1 of the first lens group, a combined focal length fw of the zoom lens system at the wide-angle end, a focal length f51 of the negative biconcave lens in the fifth lens group, and a focal length f52 of the positive biconvex lens in the fifth lens group satisfy Conditions (1.1) and (1.2) given below.

$$13.5 < f1/fw < 17.5 \quad (1.1)$$

$$1.0 < |f51/f52| < 1.5 \quad (1.2)$$

In this zoom lens system, it is possible to set the power of the first lens group in the range of Condition (1.1), to fix the first lens group, to carry out zooming by moving the second lens group to the fifth lens group, and also possible to carry out focus adjustments and to correct aberration by the fifth lens group that has a simple, two-lens construction that is a combination of a negative biconcave lens to a positive biconvex lens. By using a construction where sufficient lens surfaces can be provided in the fifth lens group without cementing the two lenses, it is possible to increase design freedom. Also, by setting the power balance of the negative lens and the positive lens substantially equal according to Condition (1.2) and disposing the two lenses in proximity so that the air space between the two lenses is shorter than the center thickness of the negative biconcave lens, it is possible to achieve a high aberration correcting performance with the four surfaces of the two lenses. Accordingly, it is possible to provide a zoom lens system that is bright, compact, and capable of favorably correcting various aberrations.

When the upper limit of Condition (1.1) is exceeded, the refractive power of the first lens group is low relative to the entire zoom lens system, there is a tendency for curvature of field to increase, and it becomes difficult to make the zoom lens system compact. On the other hand, when the lower limit of Condition (1.1) is exceeded, the refractive power of the first lens group is high relative to the entire zoom lens system, so that it becomes difficult to correct various aberrations including spherical aberration and comatic aberration, and there is a tendency for the F number to increase at the telephoto end.

When the upper limit of Condition (1.2) is exceeded, the refractive power of the positive lens in the fifth lens group is high relative to the negative lens, and there is deterioration in the telecentric characteristics. On the other hand, when the lower limit of Condition (1.2) is exceeded, the refractive power of the positive lens in the fifth lens group is low relative to the negative lens, which makes it difficult to make the zoom lens system compact.

In addition, the first lens group should preferably consist, in order from the object side, of a cemented lens and a positive meniscus lens that is convex on the object side, the cemented lens being composed in order from the object side of a negative meniscus lens that is convex on the object side and a positive biconvex lens. The second lens group should preferably consist, in order from the object side, of a negative meniscus lens that is convex on the object side, a negative biconcave lens, a positive biconvex lens, and a negative meniscus lens that is convex on the image side, where both surfaces of the negative meniscus lens convex on the image side are aspherical. The third lens group should preferably consist, in order from the object side, of a positive meniscus lens that is convex on the object side, a positive biconvex lens, and a negative meniscus lens that is convex on the object side, where both surfaces of the positive meniscus lens are aspherical. The fourth lens group should preferably consist of a positive biconvex lens and a negative meniscus lens that is convex on the image side. The Abbe number v23 of the positive biconvex lens in the second lens group, the Abbe number v32 of the positive biconvex lens in the third lens group, and the Abbe number v41 of the positive biconvex lens L41 in the fourth lens group should preferably satisfy Conditions (2.1) to (2.3) given below.

$$0 < v23 < 25.0 \quad (2.1)$$

$$60.0 < v32 < 90.0 \quad (2.2)$$

$$60.0 < v41 < 70.0 \quad (2.3)$$

In this zoom lens system, since the second lens group, the third lens group, and the fourth lens group have low-cost constructions that do not include a cemented lens, Conditions (2.1) to (2.3) are set in order to correct chromatic aberration. Condition (2.1) is set in order to ensure that the second lens group that has negative refractive power has high dispersion and Conditions (2.2) and (2.3) are set to ensure that the third lens group and the fourth lens group that have positive refractive power have low dispersion. Accordingly, by combining the second lens group that has high dispersion and negative refractive power and the third lens group and the fourth lens group that have low dispersion and positive refractive power, a construction that is advantageous for correcting chromatic aberration is achieved.

The fourth lens group of the zoom lens system should preferably consist, in order from the object side, of the positive biconvex lens and the negative meniscus lens, the positive biconvex lens and the negative meniscus lens being disposed with an air space that is shorter than or equal to a center thickness of the negative meniscus lens in between. The air space should preferably being shorter than the center thickness of the negative meniscus lens. The forth lens group has symmetrical arrangement to that of the fifth lens group and moves different direction during zooming, it becomes effective to correct various aberrations.

In this zoom lens system, during zooming from the wide-angle end to the telephoto end, it is preferable for the second lens group to move from the object side toward the image side, for the fourth lens group to move from the image side toward the object side, for the fifth lens group to move from the object side toward the image side, and for the third lens group to move from the image side toward the object side and, after reaching a middle position between the wide-angle end and the telephoto end, for the third lens group to first move from the object side toward the image side and then move from the image side toward the object side. The third lens group should preferably move back and forth on an s-shaped trajectory while changing from a trajectory that is convex on the object side to a trajectory that is convex on the image side. It is possible to have the third lens group approach the second lens group at the telephoto end, this construction is advantageous in achieving a high magnification ratio (a high zoom ratio).

Another aspect of the present invention is an imaging apparatus including: the zoom lens system described above; and an image pickup device disposed at an image forming position of the zoom lens system.

BRIEF DESCRIPTION OF THE DRAWINGS

FIGS. 1(a) to 1(c) show configuration of a zoom lens system and an imaging apparatus, where

FIGS. 3(a) to 3(c) are tables showing various values of the zoom lens system, where

DETAILED DESCRIPTION

Figure 1:
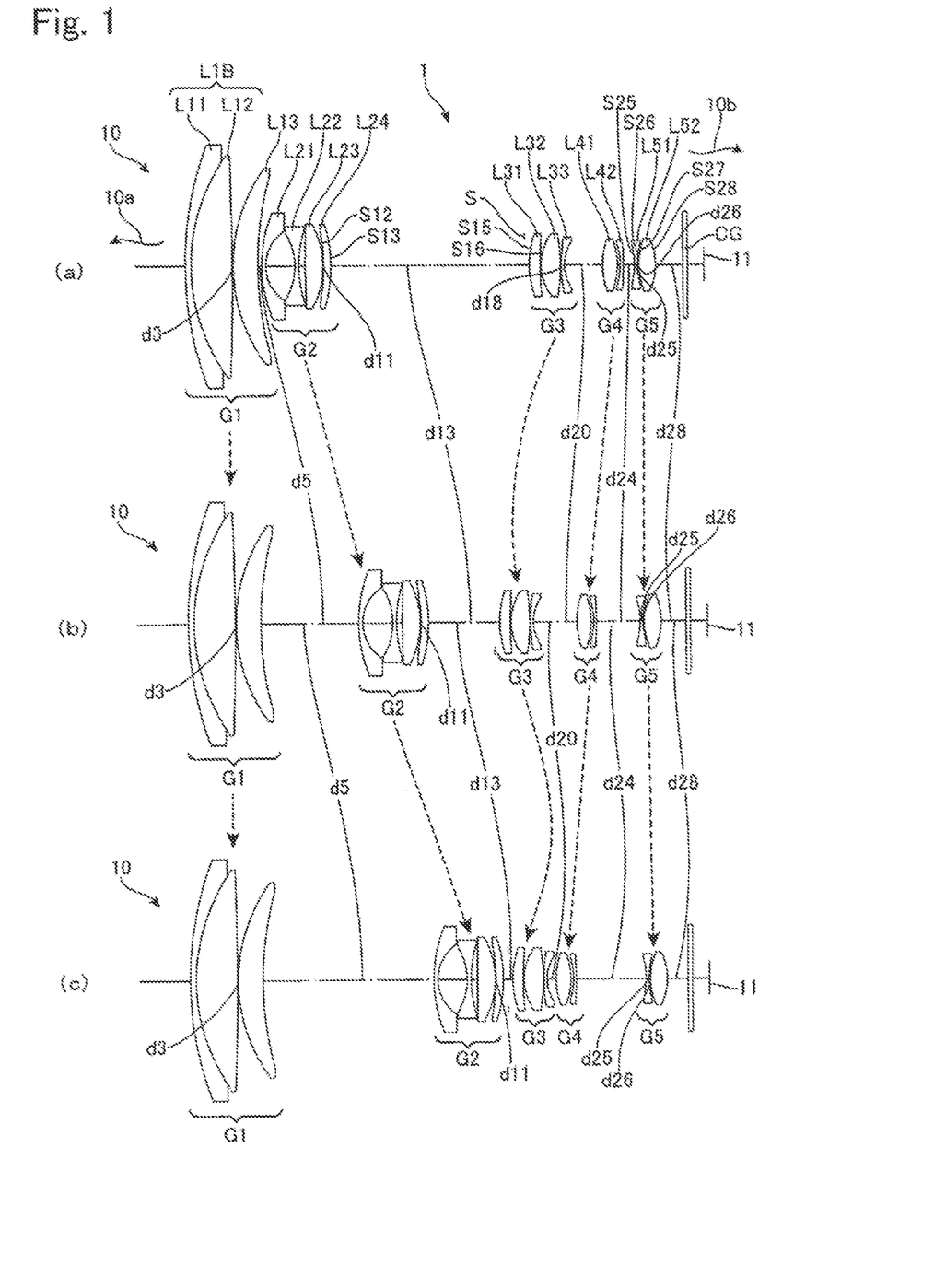
FIG. 1(a) shows the lens arrangement at the wide-angle end.
FIG. 1(b) shows the lens arrangement at a middle zoom position.
FIG. 1(c) shows the lens arrangement at the telephoto end.

FIGS. 1(a) to 1(c) show the overall construction of an imaging apparatus that uses a zoom lens system according to an embodiment of the present invention. The imaging apparatus (image pickup apparatus) 1 includes a zoom lens system 10 and an image pickup device ("image pickup element" or "image sensor") 11 such as a CCD or a CMOS that converts an image formed by the zoom lens system 10 to an electric signal (image data). The zoom lens system 10 consists, in order from the object side 10a, of a first lens group G1 with positive refractive power, a second lens group G2 with negative refractive power, a stop (aperture) S, a third lens group G3 with positive refractive power, a fourth lens group G4 with positive refractive power, and a fifth lens group G5 with positive refractive power. The image pickup device 11 provides image data to a host apparatus such as a personal computer and/or transfers image data to an external information processing apparatus via a computer network or the like.

FIG. 1(a) shows the lens arrangement at the wide-angle end (WIDE) of the zoom lens system 10, FIG. 1(b) shows the lens arrangement at a middle zoom position (MIDD) of the zoom lens system 10, and FIG. 1(c) shows the lens arrangement at the telephoto end (TELE) of the zoom lens system 10.

The first lens group G1 that is closest to the object (subject) side 10a is a lens group that has an overall positive refractive power, and, in order from the object side 10a, consists of a cemented doublet lens (balsam lens) L1B and a positive meniscus lens L13 that is convex on the object side 10a. The cemented lens L1B is constructed, in order from the object side 10a, of a negative meniscus lens L11 that is convex on the object side 10a and a positive biconvex lens L12. The cemented lens L1B and the positive meniscus lens L13 are disposed with the smallest air space in the zoom lens system 10 (in the present embodiment 0.150 mm) in between. In addition, the first lens group G1 includes the negative meniscus lens L11 with the largest effective diameter (aperture) out of the zoom lens system 10, and in the present embodiment the effective diameter of the negative meniscus lens L11 in the first lens group G1 is around 2.4 times the effective diameter of a negative meniscus lens L21 of the second lens group G2.

The second lens group G2 is a lens group with an overall negative refractive power, and, in order from the object side 10a, consists of a negative meniscus lens L21 that is convex on the object side 10a, a negative biconcave lens L22, a positive biconvex lens L23, and a negative meniscus lens L24 that is convex on the image side 10b. Both surfaces of the negative meniscus lens L24, that is, a surface S12 on the object side 10a and a surface S13 on the image side 10b are aspherical. The positive lens L23 and the negative meniscus lens L24 are disposed with the smallest air space d11 in the zoom lens system 10 (in the present embodiment 0.150 mm) in between.

The third lens group G3 is a lens group with an overall positive refractive power, and, in order from the object side 10a, consists of the positive meniscus lens L31 that is convex on the object side 10a, a positive biconvex lens L32, and a negative meniscus lens L33 that is convex on the object side 10a. Both surfaces of the positive meniscus lens L31, that is, a surface S15 on the object side 10a and a surface S16 on the image side 10b are aspherical. A stop S is disposed on the object side 10a of the third lens group G3 and moves together with the third lens group G3 during zooming. The positive lens L32 and the negative meniscus lens L33 are disposed with the smallest air space d18 in the zoom lens system 10 (in the present embodiment 0.150 mm) in between.

The fourth lens group G4 is a lens group with an overall positive refractive power, and, in order from the object side 10a, consists of a positive biconvex lens L41 and a negative meniscus lens L42 that is convex on the image side 10b, such lenses being disposed with an air space d22 that is shorter than the thickness d23 at the center of the negative meniscus lens L42 in between. The air space d22 may be equal to the thickness d23 but the air space d22 should be preferably shorter than the thickness d23. In the present embodiment, the effective diameter of the positive lens L41 in the fourth lens group G4 is around 0.2 times the effective diameter of the negative meniscus lens L11 in the first lens group G1 and around 0.98 times the effective diameter of a positive lens L52 in the fifth lens group G5.

The fifth lens group G5 that is closest to the image side 10b is a lens group with an overall positive refractive power, and in order from the object side 10a, includes a negative biconcave lens L51 and a positive biconvex lens L52, such lenses being disposed with an air space d26 that is shorter than the thickness d25 at the center of the negative lens L51 in between. The air space d26 may be equal to the thickness d25 but the air space d26 should preferably be shorter than the thickness d25. Both surfaces of the positive lens L52, that is, a surface S27 on the object side 10a and a surface S28 on the image side 10b are aspherical. The image pickup device 11 is disposed on the image side 10b of the fifth lens group G5 with a cover glass CG made of one sheet of glass in between. The fifth lens group G5 also includes the negative lens 51 with the smallest effective diameter (aperture) in the zoom lens system 10. Note that the cover glass is not limited to a single sheet and it is possible to dispose a plurality of sheets.

In this zoom lens system 10, by using the configuration with the five lens groups G1 to G5 with positive, negative, positive, positive, and positive refractive powers in order from the object side 10a, it is possible to make the image side 10b telecentric or near telecentric, so that the image pickup device 11 can form clear images even if the image pickup device 11 is moved slightly in the direction of the optical axis.

As shown in FIGS. 1(a) to 1(c), when the zoom lens system 10 zooms from the wide-angle end to the telephoto end, the first lens group G1 is fixed and does not move, the second lens group G2, the third lens group G3, and the fourth lens group G4 move so as to approach one another, and the fifth lens group G5 moves so as to become distant from the fourth lens group G4. That is, during zooming, the lens groups G2 to G5 aside from the first lens group G1 are driven by a lens driving mechanism, not shown.

In the zoom lens system 10, the first lens group G1 is fixed, and zooming is carried out by moving the second lens group G2 to the fifth lens group G5, with focus adjustments being carried out by the fifth lens group G5 that has a simple, two-lens construction that is a combination of a negative biconcave lens L51 and a positive biconvex lens L52. With the fifth lens group G5, by using a construction where the two lenses L51 and L52 are not cemented and it is easy to provide a plurality of lens surfaces (which is effective in correcting aberration), there is an increase in design freedom. In addition, by making the air space d26 between the lenses L51 and L52 shorter than the thickness d25 of the center of the negative lens L51, a construction is achieved where it is possible to attain sufficient aberration correcting performance with the four lens surfaces S25, S26, S27, and S28 of the two lenses L51 and L52. Also, by making both surfaces S27 and S28 of the positive lens L52 that is the final lens in the zoom lens system 10 aspherical, favorable correction of aberration is possible.

In the zoom lens system 10, during zooming, the first lens group G1 is fixed. This means that there is no need to move the first lens group G1 that is heavy and includes the negative meniscus lens L11 which is the lens with the largest effective diameter in the zoom lens system 10 (in the present embodiment around 47.10 mm), which makes it possible to simplify the driving mechanism for zooming. Accordingly, when mounting the zoom lens system 10 in the imaging apparatus 1, the mechanical and electrical loads can be reduced, which makes it easier to make the lens barrel and the imaging apparatus 1 compact.

In addition, in the zoom lens system 10, during zooming, the first lens group G1 closest to the object side 10a does not move and the fifth lens group G5 closest to the image side 10b only moves a short distance from the object side 10a toward the image side 10b. This means that it is possible to prevent an increase in the overall length of the lens system and to provide a compact zoom lens system 10.

In addition, in the zoom lens system 10, during zooming, the second lens group G2 moves unidirectionally from the object side 10a to the image side 10b and the fourth lens group G4 moves unidirectionally from the image side 10b to the object side 10a. The fourth lens group G4 has the symmetric arrangement of lenses to the fifth lens group G5 and moves different direction to the fifth lens group G5 during zooming. Such configuration is effective to correct various aberrations. That is, with the forth lens group G4, by using a construction where the two lenses of the positive lens L41 and the negative lens L42 that is symmetrical to the fifth lens group G5 and the two lenses are not cemented and it is easy to provide a plurality of lens surfaces (which is effective in correcting aberration), there is an increase in design freedom. By making the air space d22 between the lenses L41 and L42 shorter than the thickness d23 of the center of the negative lens L42, a construction is achieved where it is possible to attain sufficient aberration correcting performance with the four lens surfaces S21, S22, S23, and S24 of the two lenses L41 and L42.

The third lens group G3 moves from the image side 10b to the object side 10a and from an intermediate position between the wide-angle end and the telephoto end (the "middle zoom position") onwards, first moves from the object side 10a toward the image side 10b and then moves from the image side 10b toward the object side 10a. That is, when zooming to the middle zoom position from the wide angle end, there is comparatively large movement of the third lens group G3 from the image side 10b toward the object side 10a and after that, when zooming from the middle zoom position to the telephoto end, there is comparatively large movement of the third lens group G3 back from the object side 10a toward the image side 10b and then finally slight movement of the third lens group G3 from the image side 10b toward the object side 10a. This means that when zooming from the wide-angle end to the telephoto end, the third lens group G3 moves so as to gradually change from a trajectory that is convex toward the object side 10a to a trajectory that is convex toward the image side 10b and as a whole moves back and forth on an s-shaped trajectory.

When zooming from the wide-angle end to the middle zoom position, the third lens group G3 moves toward the second lens group G2, and after that, when zooming from the middle zoom position to the telephoto end, the third lens group G3 moves toward the fourth lens group G4 before finally moving together with the fourth lens group G4 toward the second lens group G2. In this way, if the third lens group G3 moves back and forth on an s-shaped trajectory when zooming from the wide-angle end to the telephoto end, compared to when the third lens group G3 moves uniformly from the image side 10b to the object side 10a or when the third lens group G3 moves on a trajectory that is convex toward the object side 10a, it is easy to reduce the air spaces d13 and d20 of the lens groups G2, G3, and G4. Since it is possible to have the second lens group G2, the third lens group G3, and the fourth lens group G4 approach one another at the telephoto end, this construction is advantageous in achieving a high magnification ratio (a high zoom ratio).

Also, by having the third lens group G3 move back and forth on an s-shaped trajectory when zooming from the wide-angle end to the telephoto end, it is possible for the third lens group G3 to become much closer to the second lens group G2 at the telephoto end. Since it is possible to minimize the distance moved by the second lens group G2 for zooming, it is possible to achieve a sufficient angle of field even at the telephoto end, thereby making it possible to provide a zoom lens system 10 that Is compact and has, a wide angle of field.

The first lens group G1 is constructed, in order from the object side 10a, of the negative meniscus lens L11 that is convex on the object side 10a, the positive biconvex lens L12, and the positive meniscus lens L13 that is convex on the object side 10a. For this reason, the principal focal point of the first lens group G1 can be disposed on the image side 10b, that is, on the second lens group G2 side. Accordingly, as shown in FIG. 1(a), it is possible to reduce the distance between principal points for the first lens group G1 and the second lens group G2 at the wide-angle end. On the other hand, the third lens group G3 is constructed, in order from the object side 10a, of the positive meniscus lens L31 that is convex on the object side 10a, the positive biconvex lens L32, and the negative meniscus lens L33 that is convex on the object side 10a. For this reason, the principal focal point of the third lens group G3 can be disposed on the object side 10a, that is, on the second lens group G2 side. Since the third lens group G3 moves back and forth on an s-shaped trajectory, at the telephoto end, the third lens group G3 can be placed much closer to the second lens group G2. Accordingly, as shown in FIG. 1(c), it is possible to reduce the distance between principal points for the third lens group G3 and the second lens group G2 at the telephoto end.

By minimizing the distance between principal points for the first lens group G1 and the second lens group G2 at the wide-angle end and minimizing the distance between principal points for the third lens group G3 and the second lens group G2 at the telephoto end, it is possible to maximize the displacement (percentage of change) in the distance between principal points during zooming. This means that it is possible to provide a zoom lens system 10 with a high magnification ratio (i.e., a high zoom ratio) of around 12× in spite of the first lens group G1 being fixed.

In the zoom lens system 10, focus adjustments after zooming are carried out by moving the fifth lens group G5, which is lightweight, has a simple, two-lens construction composed of the negative biconcave lens L51 and the positive biconvex lens L52, and includes the negative lens L51 with the smallest effective diameter out of the lenses in the zoom lens system 10 (in the present embodiment around 8.90 mm), forwards and backwards. In addition, the fifth lens group G5 that carries out focus adjustments (or "focusing") is not sandwiched by the lens groups G2 to G5 (the "zoom group") that carry out zooming and is instead disposed on the image side 10b of the zoom group. For this reason, it is possible to simplify the driving mechanism used for focusing, which makes it possible to reduce the mechanical load on the image pickup apparatus 1 and easier to make the image pickup apparatus 1 more compact.

In the zoom lens system 10, the cemented lens L1B is included in the first lens group G1 that is fixed and does not move during zooming, and no cemented lenses are included in the lens groups G2 to G5 that move during zooming. This means that it is possible to increase the number of lenses and the number of lens surfaces in the lens groups G2 to G5, which increases the design freedom for correcting aberration. Accordingly, it is possible to provide a low-cost zoom lens system 10 that has an advantageous construction for achieving high performance and a high zoom ratio and does not include a cemented lens in the lens groups G2 to G5.

In addition, the fourth lens group G4 is constructed in order from the object side 10a of the positive biconvex lens L41 and the negative meniscus lens L42 that is convex on the image side 10b and the fifth lens group G5 is constructed in order from the object side 10a of the negative biconcave lens L51 and the positive biconvex lens L52. This means that the fourth lens group G4 with the positive-negative arrangement and the fifth lens group G5 with the negative-positive arrangement are disposed on the image side 10b of the zoom lens system 10. A lens construction where two groups G4 and G5 that have symmetrical lens arrangements and effective diameters that are substantially equal are disposed in this way as the fourth lens group and fifth lens group closest to the image side 10b is effective in correcting various aberrations.

In the second lens group G2 and the third lens group G3 where there is large displacement in the distance between principle points during zooming, both surfaces S12 and S13 of the negative meniscus lens L24 disposed closest to the image side 10b in the second lens group G2 and both surfaces S15 and S16 of the positive meniscus lens L31 disposed closest to the object side 10a in the third lens group G3 are aspherical. Since both surfaces S12 and S13 of the negative meniscus lens L24 that is the final lens in the second lens group G2 in a direction from the object side 10a to the image side 10b are aspherical, it is possible to suppress spherical aberration and comatic aberration. In addition, since both surfaces S15 and 516 of the positive meniscus lens L31 that is the first lens in the third lens group G3 in a direction from the object side 10a to the image side 10b are aspherical, the construction is effective in correcting various aberrations.

In this way, a lens construction where, on both sides of the stop S, both surfaces S12 and S13 of the negative meniscus lens L24 disposed immediately before the stop S and both surfaces S15 and S16 of the positive meniscus lens L31 disposed immediately after the stop S are aspherical is effective in suppressing various aberrations and also correcting various aberrations. In addition, a symmetrical lens construction where the negative meniscus lens L24 whose two surfaces S12 and S13 are aspherical and the positive meniscus lens L31 whose two surfaces S15 and S16 are aspherical are disposed on both sides of the stop S is effective in correcting distortion.

In this zoom lens system 10, the combined focal length f1 of the first lens group G1, the combined focal length fw of the zoom lens system 10 at the wide-angle end, the focal length f51 of the negative lens L51 in the fifth lens group G5, and the focal length f52 of the positive lens L52 in the fifth lens group G5 should preferably satisfy Conditions (1.1) and (1.2) given below.

$$13.5 < f1/fw < 17.5 \tag{1.1}$$

$$1.0 < |f51/f52| < 1.5 \tag{1.2}$$

When the upper limit of Condition (1.1) is exceeded, the refractive power of the first lens group G1 is low relative to the entire zoom lens system 10, there is a tendency for curvature of field to increase, and it becomes difficult to make the zoom lens system 10 compact. On the other hand, when the lower limit of Condition (1.1) is exceeded, the refractive power of the first lens group G1 is high relative to the entire zoom lens system 10, so that it becomes difficult to correct various aberrations including spherical aberration and comatic aberration, and there is a tendency for the F number to increase at the telephoto end.

When the upper limit of Condition (1.2) is exceeded, the refractive power of the positive lens L52 of the fifth lens group G5 is high relative to the negative lens L51, and there is deterioration in the telecentric characteristics. On the other hand, when the lower limit of Condition (1.2) is exceeded, the refractive power of the positive lens L52 of the fifth lens group G5 is low relative to the negative lens L51, which makes it difficult to make the zoom lens system 10 compact.

The upper limit of Condition (1.1) should preferably be 16.2 and the lower limit of Condition (1.1) should also preferably be 15.0. The upper limit of Condition (1.2) should preferably be 1.4 and the lower limit of Condition (1.2) should also preferably be 1.1.

In the zoom lens system 10, the Abbe number v23 of the positive lens L23 of the second lens group G2, the Abbe number v32 of the positive lens L32 of the third lens group G3, and the Abbe number v41 of the positive lens L41 of the fourth lens group G4 should preferably also satisfy Conditions (2.1) to (2.3) below.

$$0 < v23 < 25.0 \quad (2.1)$$

$$60.0 < v32 < 90.0 \quad (2.2)$$

$$60.0 < v41 < 70.0 \quad (2.3)$$

Since the second lens group G2, the third lens group G3, and the fourth lens group G4 have low-cost constructions that do not include a cemented lens, Conditions (2.1) to (2.3) are set in order to correct chromatic aberration. Condition (2.1) is set in order to ensure that the second lens group G2 that has negative refractive power has high dispersion and Conditions (2.2) and (2.3) are set to ensure that the third lens group G3 and the fourth lens group G4 that have positive refractive power have low dispersion. By combining the second lens group G2 that has high dispersion and negative refractive power and the third lens group G3 and the fourth lens group G4 that have low dispersion and positive refractive power, a construction that is advantageous for correcting chromatic aberration is achieved.

When the upper limit of Condition (2.1) is exceeded, the dispersion of the positive lens L23 in the second lens group G2 is low and it becomes difficult to correct the chromatic aberration produced, by the negative meniscus lens L24 that is convex toward the image side 10b of the second lens group G2. When the lower limit of Condition (2.2) is exceeded, the dispersion of the positive lens L32 in the third lens group G3 is high and it becomes difficult to correct the chromatic aberration produced by the negative meniscus lens L33 that is convex toward the object side 10a of the third lens group G3. When the lower limit of Condition (2.3) is exceeded, the dispersion of the positive lens L41 in the fourth lens group G4 is high and it becomes difficult to correct the chromatic aberration produced by the negative meniscus lens L42 that is convex toward the image side 10b of the fourth lens group G4.

The upper limit of Condition (2.1) should preferably be 24.0, the upper limit of Condition (2.2) should also preferably be 82.0, and the upper limit of Condition (2.3) should also preferably be 64.0.

Figure 2:
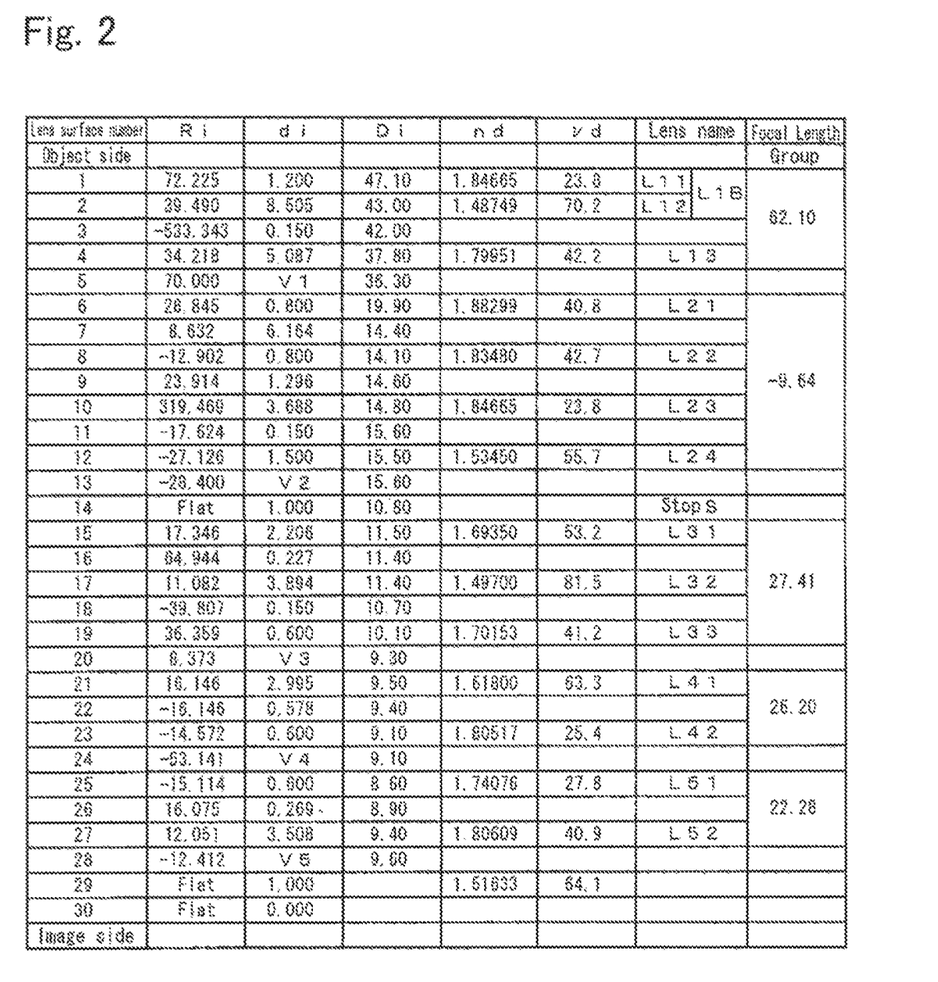
FIG. 2 is a table showing lens data of the zoom lens system.
Figure 3:
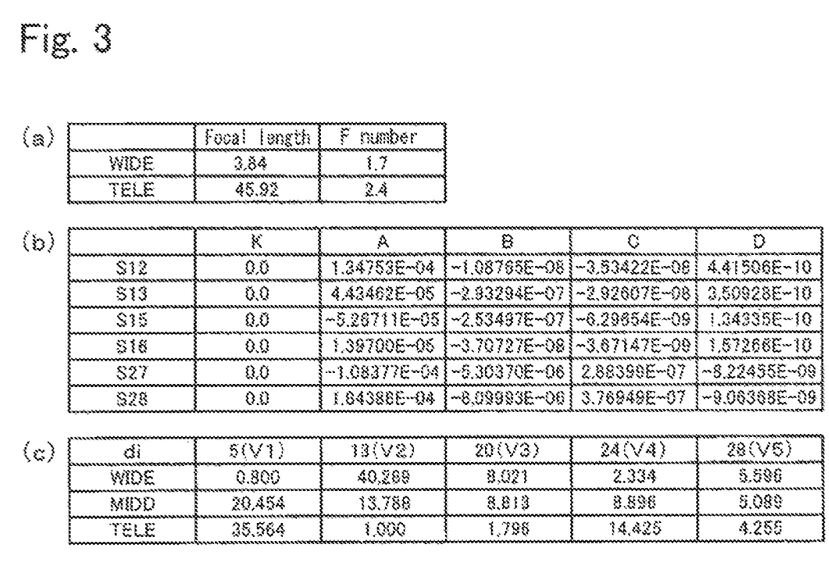
FIG. 3(a) shows basic data.
FIG. 3(b) shows aspherical surface data.
FIG. 3(c) shows zoom data.

FIG. 2 shows lens data on the various lenses in the zoom lens system 10. FIG. 3 shows various values for the zoom lens system 10. In the lens data, "Ri" represents the radius of curvature (mm) of each lens (lens surface) disposed in order from the object side 10a, "di" represents the distance (air space, mm) between the respective lens surfaces disposed in order from the object side 10a, "Di" represents the effective diameter (mm) of each lens surface disposed in order from the object side 10a, "nd" represents the refractive index (d line) of each lens disposed in order from the object side 10a, and "vd" represents the Abbe number (d line) of each lens disposed in order from the object side 10a. In FIG. 2, "Flat" indicates a flat surface. In FIG. 3(b), "En" refers to the "$n^{th}$ power of 10". As examples, "E-04" refers to "10 to the power −4" and "E-10" refers to "10 to the power −10".

As shown in FIG. 3(c), with the zoom lens system 10, zooming is carried out by moving the lens groups G2 to G5, so that the air space (distance) d5 between the first lens group G1 and the second lens group G2, the air space d13 between the second lens group G2 and the stop S, the air space d20 between the third lens group G3 and the fourth lens group G4, the air space d24 between the fourth lens group G4 and the fifth lens group G5, and the air space d28 between the fifth lens group G5 and the cover glass CG change.

Both surfaces S12 and S13 of the negative meniscus lens L24 disposed closest to the image side 10b of the second lens group G2, both surfaces S15 and S16 of the positive meniscus lens L31 disposed closest to the object side 10a of the third lens group G3, and both surfaces S27 and S28 of the positive lens L52 disposed closest to the image side 10b of the fifth lens group G5 are aspherical. The aspherical surfaces are expressed by the following expression using the coefficients K, A, B, C, and D shown in FIG. 3(b) with X as the coordinate in the optical axis direction, Y as the coordinate in a direction perpendicular to the optical axis, the direction in which light propagates as positive, and R as the paraxial radius of curvature.

$$X = (1/R)Y^2/[1+\{1-(1+K)(1/R)^2 Y^2\}^{1/2}] + AY^4 + BY^6 + CY^8 + DY^{10}$$

When the combined focal length of the first lens group G1 of the zoom lens system 10 according to the present embodiment is expressed as "f1", the combined focal length of the zoom lens system 10 at the wide-angle end is expressed as "fw", the focal length of the negative lens L51 in the fifth lens group G5 is expressed as "f51", and the focal length of the positive lens L52 in the fifth lens group G5 is expressed as "f52", the values of Conditions (1.1) and (1.2) described above become as shown below due to the values shown in FIGS. 3(a) to 3(c).

$$f1/fw = 16.16 \quad \text{Condition (1.1)}$$

$$|f51/f52| = 1.29 \quad \text{Condition (1.2)}$$

Accordingly, the zoom lens system 10 of this embodiment satisfies Conditions (1.1) and (1.2).

When the Abbe number of the positive lens L23 in the second lens group G2 of the zoom lens system 10 according to the present embodiment is expressed as "v23", the Abbe number of the positive lens L32 in the third lens group G3 is expressed as "v32", and the Abbe number of the positive lens L41 in the fourth lens group G4 is expressed as "v41", the values of Conditions (2.1) to (2.3) described above become as shown below due to the values shown in FIG. 2.

$$v23=23.8 \quad \text{Condition (2.1)}$$

$$v32=81.5 \quad \text{Condition (2.2)}$$

$$v41=63.3 \quad \text{Condition (2.3)}$$

Accordingly, the zoom lens system 10 of this embodiment satisfies Conditions (2.1) to (2.3).

Figure 4:
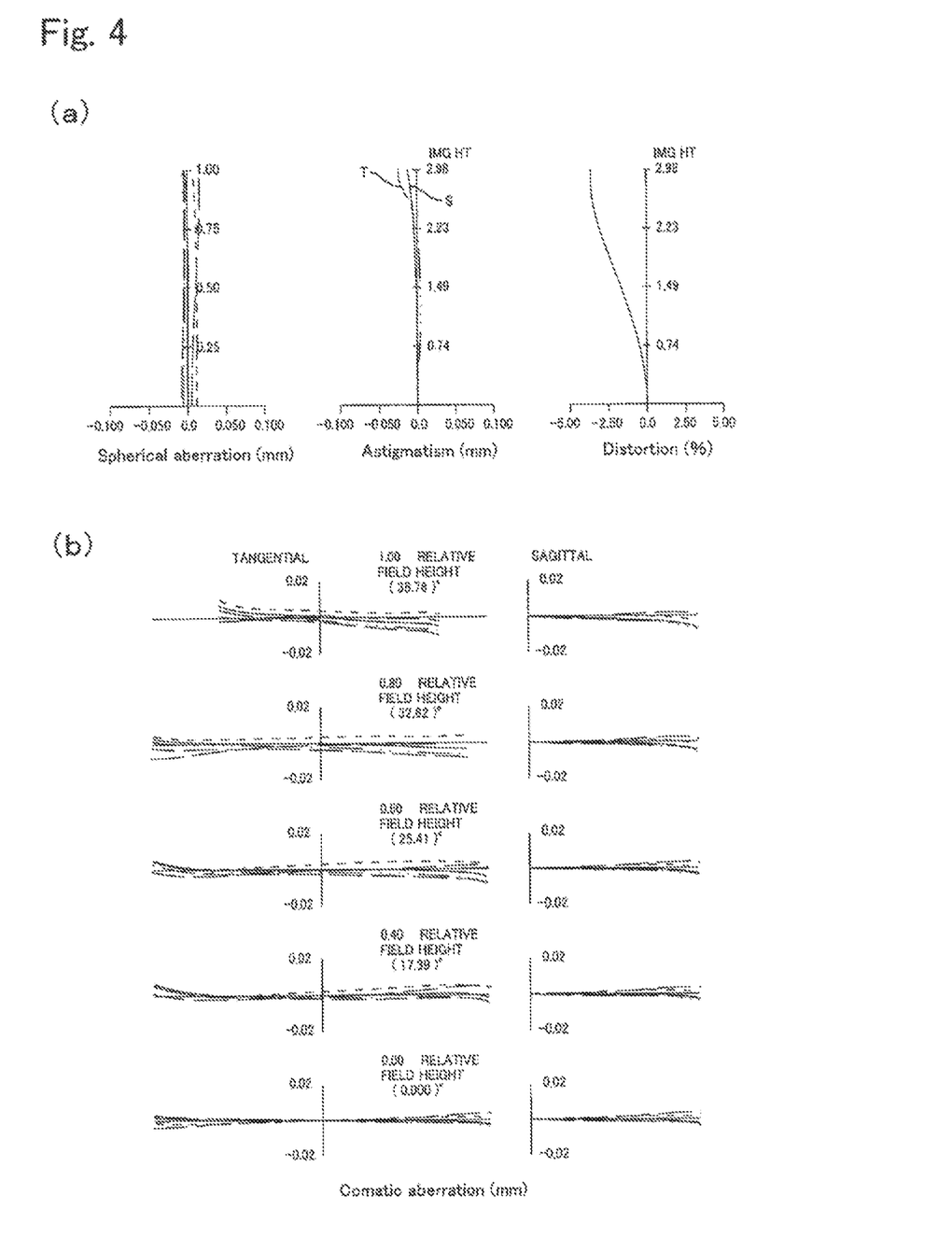
FIGS. 4(a) and 4(b) are aberration graphs at the wide-angle end of the zoom lens system, with FIG. 4(a) showing longitudinal aberration and FIG. 4(b) showing lateral aberration.
Figure 5:
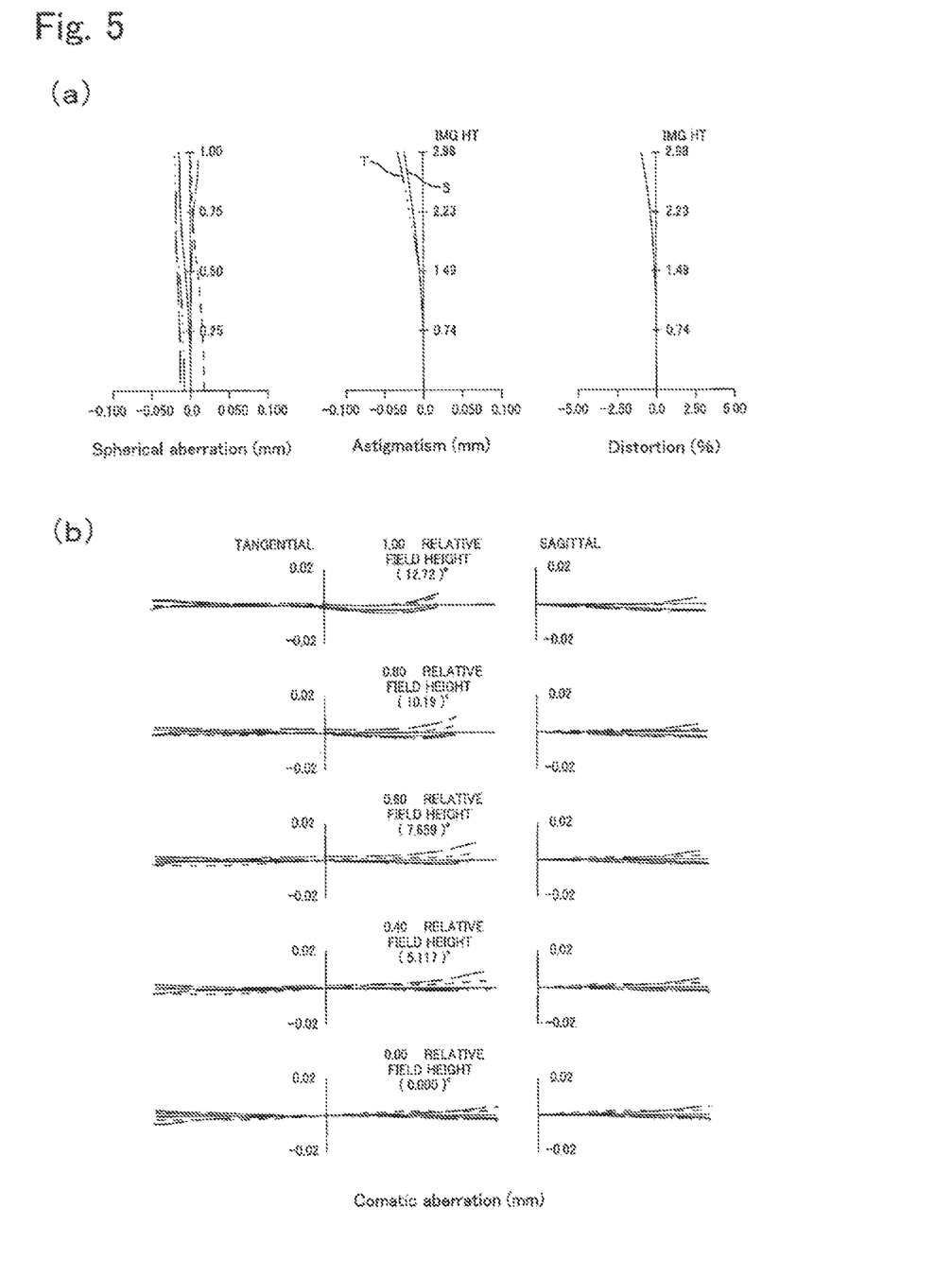
FIGS. 5(a) and 5(b) are aberration graphs at a middle zoom position of the zoom lens system, with FIG. 5(a) showing longitudinal aberration and FIG. 5(b) showing lateral aberration.
Figure 6:
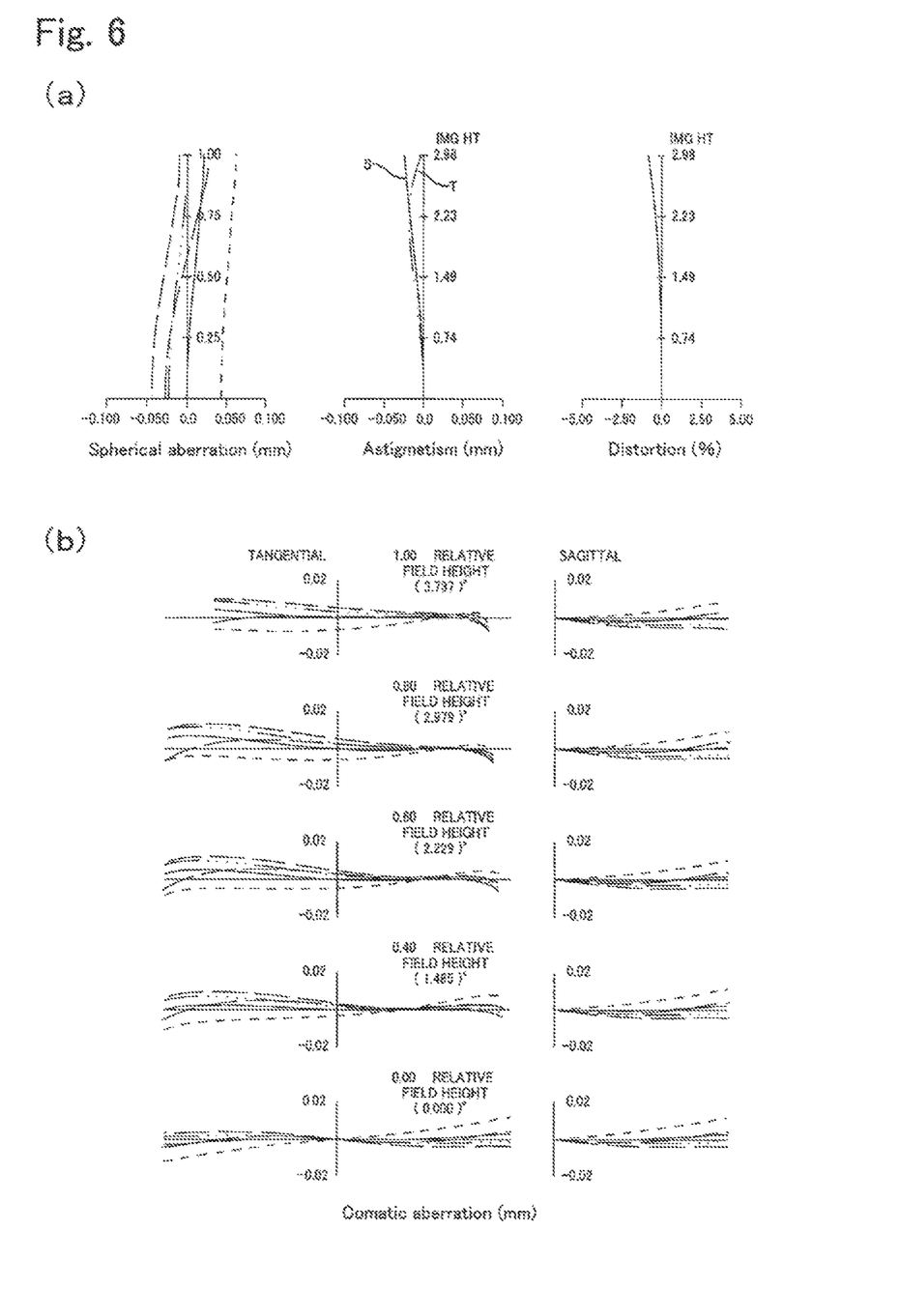
FIGS. 6(a) and 6(b) are aberration graphs at the telephoto end of the zoom lens system, with FIG. 6(a) showing longitudinal aberration and FIG. 6(b) showing lateral aberration.

FIGS. 4(a) and (b) are graphs showing longitudinal aberration and lateral aberration at the wide-angle end of the zoom lens system 10. FIGS. 5(a) and (b) are graphs showing longitudinal aberration and lateral aberration at a middle zoom position of the zoom lens system 10. FIGS. 5(a) and (b) are graphs showing longitudinal aberration and lateral aberration at the telephoto end of the zoom lens system 10. As shown in FIGS. 4(a) to 6(b), various aberrations are all favorably corrected and it is possible to form clear images. Note that spherical aberration is shown for the respective wavelengths of 656 nm (dotted line), 587 nm (solid line), 546 nm (five dots-dash line), 486 nm (dot-dash line), and 435 nm (two dots-dash line). Astigmatism and comatic aberration are respectively shown for tangential rays (T) and sagittal rays (S).

With the zoom lens system 10 according to the present embodiment, it is possible to achieve an extremely wide angle of view, to achieve a high F number of 1.7 at the wide-angle end, and to achieve a high zoom ratio of around 12×. This means that the zoom lens system 10 has high performance, a high zoom ratio, and a wide angle of view, and is therefore suited to applications such as a teleconferencing camera and a monitoring camera. Note that in the fourth lens group G4, in place of the above arrangement of the positive lens L41 and the negative meniscus lens L42, it is also possible to dispose the negative meniscus lens L42 and the positive lens L41 in that order from the object side 10a. In addition, the negative meniscus lens L42 can be constructed so as to be convex on the object side 10a (i.e., concave on the positive lens L41 side). It is also possible to produce a cemented lens by cementing the positive lens L41 and the negative meniscus lens L42.

Note that with the zoom lens system 10 according to the present embodiment, although the third lens group G3 moves back and forth on a so-called s-shaped trajectory when zooming from the wide-angle end to the telephoto end, the third lens group G3 may move on a trajectory that is convex on the object side 10a. It is also preferable to change the direction of movement of the fifth lens group G5 in accordance with the focal length. As one example, at close range where the distance to the object is around 1 m, when zooming from the wide-angle end to the telephoto end, the fifth lens group G5 should preferably move from the image side 10b toward the object side 10a.

What is claimed is:

1. A zoom lens system comprising, in order from an object side:
   a first lens group with positive refractive power;
   a second lens group with negative refractive power;
   a third lens group with positive refractive power;
   a fourth lens group with positive refractive power; and
   a fifth lens group with positive refractive power,
   wherein the fifth lens group includes, in order from the object side, a negative biconcave lens and a positive biconvex lens, the negative biconcave lens and the positive biconvex lens being disposed with an air space in between, wherein said airspace is shorter than or equal to a center thickness of the negative biconcave lens and both surfaces of the positive biconvex lens being aspherical,
   when the zoom lens system zooms from a wide-angle end to a telephoto end, the first lens group does not move, the second lens group, the third lens group, the fourth lens group and the fifth lens group move, and focus adjustments are carried out by the fifth lens group, and
   a combined focal length f1 of the first lens group, a combined focal length fw of the zoom lens system at the wide-angle end, a focal length f51 of the negative biconcave lens in the fifth lens group and a focal length f52 of the positive biconvex lens in the fifth lens group satisfy conditions given below $$13.5 < f1/fw < 17.5; \text{ and}$$

$$1.0 < |f51/f52| < 1.5.$$

2. The zoom lens system according to claim 1,
   wherein the first lens group consists, in order from the object side, of a cemented lens and a positive meniscus lens that is convex on the object side, the cemented lens being composed in order from the object side of a negative meniscus lens that is convex on the object side and a positive biconvex lens,
   the second lens group consists, in order from the object side, of a negative meniscus lens that is convex on the object side, a negative biconcave lens, a positive biconvex lens, and a negative meniscus lens that is convex on an image side and has aspherical surfaces,
   the third lens group consists, in order from the object side, of a positive meniscus lens that is convex on the object side, a positive biconvex lens, and a negative meniscus lens that is convex on the object side, both surfaces of the positive meniscus lens being aspherical,
   the fourth lens group includes a positive biconvex lens and a negative meniscus lens that is convex on the image side,
   the Abbe number v23 of the positive biconvex lens in the second lens group, the Abbe number v32 of the positive biconvex lens in the third lens group, and the Abbe number v41 of the positive biconvex lens L41 in the fourth lens group satisfy conditions given below $$0 < v23 < 25.0;$$

$$60.0 < v32 < 90.0; \text{ and}$$

$$60.0 < v41 < 70.0.$$

3. The zoom lens system according to claim 2,
   Wherein the fourth lens group consists, in order from the object side, of the positive biconvex lens and the negative meniscus lens, the positive biconvex lens and the negative meniscus lens being disposed with an air space in between, wherein said airspace is shorter than or equal to a center thickness of the negative meniscus lens.

4. The zoom lens system according to claim 1,
   wherein during zooming from the wide-angle end toward the telephoto end, the second lens group moves from the object side toward an image side, the fourth lens group moves from the image side toward the object side, the fifth lens group moves from the object side toward the image side, and the third lens group moves from the image side toward the object side and after reaching a middle position between the wide-angle end and the telephoto end, the third lens group first moves from the object side toward the image side and then moves from the image side toward the object side.

5. An imaging apparatus comprising:
a zoom lens system according to claim 1; and
an image pickup device disposed at an image forming position of the zoom lens system.

* * * * *